2,881,145

ALKYD RESINS CONTAINING REACTIVE PIGMENTS STABILIZED WITH ALKYL ESTERS OF PHOSPHORIC ACID

Alfred F. Schmutzler, Stamford, Conn., assignor to American Cyanamid Company, New York, N.Y., a corporation of Maine No Drawing. Application November 7, 1955
Serial No. 545,553

14 Claims. (Cl. 260—22)

This invention relates to a novel coating composition and to the process of preparing the same. More particularly, this invention relates to a novel coating composition comprising a resinous material containing fatty acid radicals and a fatty acid-reactive pigment stabilized by the addition thereto of alkyl esters of a phosphorus containing acid.

One of the objects of the present invention is to stabilize coating compositions containing resinous materials having fatty acid radicals as an integral part thereof in combination with reactive pigments. A further object of the present invention is to improve the storage stability of coating compositions comprising a resinous material containing fatty acid radicals and reactive pigments by the addition thereto of alkyl esters of phosphorus containing acids. These and other objects of the present invention will be discussed more fully hereinbelow.

Certain color-imparting substances, such as zinc oxide, leaded zinc oxide, zinc yellow, basic white lead, chrome yellow, molybdate orange, litharge, peacock blue, or the like, are known as "reactive pigments," due to their behavior in suspensions of glyceride oils and resinous-like esters.

Such suspensions have the tendency to become progressively more viscous. After prolonged storage at room temperature or in a much shorter time at elevated temperatures, they have the tendency to become irreversible, useless gels.

This transformation is apparently caused by reactive parts of the pigment and involves the polyol and acid radicals of the polyol-fatty acid esters and the polyol-polybasic acid-resinous esters, commonly known as alkyd resins. Regardless of the cause, the behavior of the reactive pigments is a serious disadvantage in commercial products, such as printing inks, paints, enamels or the like. These surface coating compositions have to meet stringent specifications with regard to viscosity, adhesion or tackiness, and consistency. Those containing reactive pigments require readjustments even after short storage periods so that they smoothly print without tearing the paper on high-speed printing presses, or so that they brush out easily without pulling out the bristles from paint brushes, or so that they flow out uniformly and evenly when applied by spray guns. These painstaking readjustment tasks can be avoided with my invention.

I have found that by adding certain alkyl esters of phosphorus containing acids to oil modified alkyd resins and enamels formulated with reactive pigments, I can eliminate completely, or in the more severe cases, greatly reduce viscosity increases on storage. Among the phosphorus-containing acids, which may be used to produce the alkyl esters useful in the practice of the present invention are phosphoric acid, phosphorous acid including the hypo, meta, ortho, and pyrophosphoric acids, and the hypo, ortho and pyro phosphorous acids. Among the aliphatic alcohols, which may be used to produce these esters are any of the saturated aliphatic monohydric alcohols and preferably those containing between 2 and 6 carbon atoms such as the ethyl, propyl, butyl, amyl, hexyl esters and the like. This includes, of course, the normal, secondary and tertiary alcohols, wherever available. Quite obviously, these alkyl esters of phosphorus containing acids may be used either singly or in combination with one another. The amount of these alkyl esters which may be used can be varied over a very substantial range depending on the type of pigment utilized and the measure of acid radicals available in the resinous material. Ordinarily, one will find tht an effective range will vary between about ½ of 1% and 10% by weight based on the total weight of the resin solids. Amounts less than ½ of 1% may be utilized but the stabilization measure accomplished is not significant enough as a general rule to warrant the use of such smaller amounts. Amounts higher than 10% may be used such as 20% or even 30% but these higher percentages will generally bring the modified coating composition into an uneconomical range from a price standpoint. For optimum results, one should be between about 2% and 6% by weight based on the total weight of the reactive or fatty acid sensitive pigment. Such reactive pigments are the zinc pigments such as zinc oxide, leaded zinc oxide, zinc yellow and the like. Reactive pigments are white lead, chrome yellow, molybdate orange and the like. Oftentimes, these pigments are used in combination with one another.

The concept of the present invention is applicable to suspensions of reactive pigments in polyol-fatty acid esters and their derivatives such as blown oils, heat-treated oils and polyol- poly-basic acid-fatty acid resinous products or their solutions, such as, for example, glyceride oil modified alkyd resins. These alkyd resins are prepared by reacting a polycarboxylic acid free of non-benzenoid unsaturation with a polyhydric alcohol in the presence of a glyceride oil. The polycarboxylic acid free of non-benzenoid unsaturation should be present in an amount approximating at least 90% by weight based on the total weight of polycarboxylic acid present. Amongst the polycarboxylic acids free of non-benzenoid unsaturation which are conventionally used in the preparation of alkyd resins are phthalic, oxalic, malonic, succinic, glutaric, sebacic, adipic, pimelic, suberic, azealic, tricarballylic, citric, tartaric, malic and the like. Wherever avalable, the anhydrides of these acids may be used. Furthermore, these acids and/or their anhydrides may be used in combination with one another. If desired, minor amounts up to about 10% by weight of alpha, beta ethylenically unsaturated polycarboxylic acids may be used based on the total amount of polycarboxylic acid present. Specifically included are maleic, fumaric, aconitic, itaconic and the like. Wherever available, the anhydrides of these acids may be used. These acids and/or their anhydrides may be used in combination with one another.

Among the polyhydric alcohols which may be used in the preparation of the alkyd resins used in the present invention are glycerol, ethylene glycol, diethylene glycol, trimethylene glycol, tetramethylene glycol, propylene gycol, dipropylene glycol, pinacol, arabitol, xylitol, adonitol, mannitol, trimethylol propane, trimethylol ethane, sorbitol, pentaerythritol, dipentaerythritol and the alkane diols such as propanediol-1,3, butanediol-1,4 and the like. These polyhydric alcohols may be used either singly or in combination with one another. Ordinarily, the amount of polyhydric alcohol used in the preparation of conventional alkyd resins will approximate a 10% excess over the amount required stoichiometrically to neutralize the carboxyl groups present in the sphere of the reaction.

Among the glyceride oils, which may be used to modify the alkyd resins used in the present invention are the non-drying, semi-drying and drying glyceride oils. Instead of using the oils per se, it is sometimes desirable to utilize the fatty acids derived from the oils or even their monoglycerides. Among the oils which may be used are coconut oil, palm oil, babassu oil, murmuru oil, palm kernel oil, rape seed oil, mustard seed oil, olive oil, peanut oil, sesame oil, corn oil, cotton seed oil, soya oil, sunflower oil, walnut oil, linseed oil, perilla oil, castor oil, either raw or dehydrated, tung oil, oiticica oil, whale oil, menhaden oil, sardine oil, herring oil and the like. For particular purposes, these oils, the fatty acids derived therefrom and/or their monoglycerides may be used either singly or in combination with one another. The oil length of the alkyd resins used in the present invention may vary over the entire range such as the short oil, medium oil or long oil alkyd resins.

In order that the concept of the present invention may be more completely understood, the following examples are set forth in which all parts are parts by weight. These examples are set forth primarily for the purpose of illustration and any specific enumeration of detail contained therein should not be interpreted as a limitation on the case except as is indicated in the appended claims.

*Example 1*

An enamel is prepared by blending 48 parts of antimony sulfide, 4 parts of ultramarine blue, 23 parts of zinc yellow, 552 parts of leaded zinc oxide, 94 parts of titanium dioxide, 100 parts of asbestine 3X (an acicular talc), 611 parts of a soya oil modified alkyd resin (oil content 48% phthalic anhydride content, 34% solvent mineral spirits, solids about 50%), 195 parts of Varsol #1 (a high boiling mineral spirits of low kauri-butanol value), 2 parts of cobalt naphthenate solution (containing 6% cobalt), and 5 parts of lead naphthenate solution (containing 24% lead). After the blend is completed, the enamel is stored at an accelerated stability temperature, namely 53° C., to determine the storage stability of the enamel. At the outset, the enamel had a consistency of 86 Krebs units. After 37 days at the elevated temperature, the consistency was 104 Krebs units. This represented a gain of 18 Krebs units.

*Example 2*

The enamel identical to the enamel of Example 1 is modified by the addition of 20.7 parts of tributyl phosphite. The initial consistency was 79.4 Krebs units. After 37 days at 53° C., the consistency was still 79.4 Krebs units.

*Example 3*

An enamel identical to the enamel of Example 1 is diluted with sufficient Varsol #1 to produce a coating composition having a consistency of 79.4 Krebs units, the same consistency as that of Example 2. After accelerated ageing at 53° C., for 37 days, the viscosity was 100 Krebs units. After 8 months of storage at room temperature, this enamel was almost a gel and could not be thinned out by the addition of more Varsol #1.

The Krebs units as used in the aforementioned examples are defined and the method of determining the same is set forth in the A.S.T.M. Bulletin D–562–47.

*Example 4*

To an enamel substantially identical with the enamel of Example 1, there is added 20.7 parts of triethyl phosphite. The initial viscosity on the Stormer viscosimeter was equivalent to 192 grams or 81 Krebs units. After storage at room temperature for 30 days, the new viscosity was equivalent to 201 grams, whereas the enamel of Example 1 without addition of a stabilizer had an initial viscosity equivalent to 226 grams or 86 Krebs units and after 37 days at room temperature, a viscosity of 253 grams or 89.4 Krebs units. After 8 months of storage at room temperature, the enamel of the present example had a viscosity equivalent to 263 grams and could readily be used by thinning the same with a small amount of Varsol #1, whereas the enamel of Example 1 was useless after the same period.

*Example 5*

To an enamel substantially identical with the enamel of Example 1, there is added 20.7 grams of triethyl phosphite. The initial viscosity was equivalent to 192 grams. After storage for 37 days at room temperature, the viscosity was equivalent to 194 grams. After storage for 37 days at 53° C., the viscosity was still equivalent to 194 grams and after 8 months at room temperature, the enamel could readily be used without thinning it.

*Example 6*

An enamel is prepared by blending the following ingredients: 48 parts of antimony sulfide, 4 parts ultramarine blue, 23 parts zinc yellow, 552 parts leaded zinc oxide, 112 parts titanium oxide, 50 parts Asbestine 3X, 660 parts of the soya alkyd resin used in Example 1, 250 parts of Varsol #1, 2.2 parts of 6% cobalt naphthenate, 5.5 parts of 24% lead naphthenate. The initial viscosity was 189 grams or 79 Krebs units. After 26 days at room temperature, the viscosity was 375 grams or 102 Krebs units. This represented an increase in viscosity of 186 grams or 23 Krebs units.

*Example 7*

Example 6 is repeated in every detail except that there is added 3 grams of triethyl phosphite. The initial viscosity was equivalent to 168 grams or 75.6 Krebs units. After 26 days at room temperature, the viscosity had increased to the equivalent of 300 grams or 95 Krebs units, representing an increase of 132 grams or 19.4 Krebs units. This example illustrates that even small amounts of an alkyl ester of a phosphorus-containing acid will have a beneficial effect on the enamel stability.

I claim:

1. A coating composition comprising (1) a glyceride oil modified alkyd resin, (2) a reactive pigment selected from the group consisting of a zinc pigment, white lead, chrome yellow, molybdate orange, litharge and peacock blue and (3) between about 0.1%–10% by weight based on the total weight of said pigment of a trialkyl ester of a phosphorus-containing acid wherein said alkyl groups contain between 2 and 6 carbon atoms.

2. A coating composition comprising (1) a glyceride oil modified alkyd resin, (2) a zinc pigment, and (3) between about 0.1%–10% by weight based on the total weight of zinc pigment of a trialkyl ester of a phosphorus-containing acid wherein said alkyl groups contain between 2 and 6 carbon atoms.

3. A coating composition comprising (1) a glyceride oil modified alkyd resin, (2) zinc oxide and (3) between about 0.1%–10% by weight based on the total weight of zinc oxide of a trialkyl ester of a phosphorus-containing acid wherein said alkyl groups contain between 2 and 6 carbon atoms.

4. A coating composition comprising (1) a glyceride oil modified alkyd resin, (2) a reactive pigment selected from the group consisting of a zinc pigment, white lead, chrome yellow, molybdate orange, litharge and peacock blue and (3) between about 0.1%–10% by weight based on the total weight of said pigment of triethyl phosphate.

5. A coating composition comprising (1) a glyceride oil modified alkyd resin, (2) a zinc pigment, and (3) between about 0.1%–10% by weight based on the total weight of said pigment of triethyl phosphate.

6. A coating composition comprising (1) a glyceride oil modified alkyd resin, (2) zinc oxide and (3) between about 0.1%–10% by weight based on the total weight of zinc oxide of triethyl phosphate.

7. A coating composition comprising (1) a glyceride oil modified alkyd resin, (2) a zinc pigment, and (3) between about 0.1%–10% by weight based on the total weight of a zinc pigment of triethyl phosphite.

8. A coating composition comprising (1) a glyceride oil modified alkyd resin, (2) zinc oxide, and (3) between about 0.1%–10% by weight based on the total weight of zinc oxide of triethyl phosphite.

9. A coating composition comprising (1) a glyceride oil modified alkyd resin, (2) a reactive pigment selected from the group consisting of a zinc pigment, white lead, chrome yellow, molybdate orange, litharge and peacock blue and (3) between about 0.1%–10% by weight based on the total weight of said pigment of tributyl phosphate.

10. A coating composition comprising (1) a glyceride oil modified alkyd resin, (2) a zinc pigment and (3) between about 0.1%–10% by weight based on the total weight of a zinc pigment of tributyl phosphate.

11. A coating composition comprising (1) a glyceride oil modified alkyd resin, (2) zinc oxide and (3) between about 0.1%–10% by weight based on the total weight of zinc oxide of tributyl phosphate.

12. A coating composition comprising (1) a glyceride oil modified alkyd resin, (2) a reactive pigment selected from the group consisting of a zinc pigment, white lead, chrome yellow, molybdate orange, litharge and peacock blue and (3) between about 0.1%–10% by weight based on the total weight of said pigment of a trialkyl ester of phosphoric acid wherein said alkyl groups contain between 2 and 6 carbon atoms.

13. A coating composition comprising (1) a glyceride oil modified alkyd resin, (2) a zinc pigment, and (3) between about 0.1%–10% by weight based on the total weight of said pigment of a trialkyl ester of phosphoric acid wherein said alkyl groups contain between 2 and 6 carbon atoms.

14. A coating composition comprising (1) a glyceride oil modified alkyd resin, (2) zinc oxide, and (3) between about 0.1%–10% by weight based on the total weight of zinc oxide of a trialkyl ester of phosphoric acid wherein said alkyl groups contain between 2 and 6 carbon atoms.

References Cited in the file of this patent

UNITED STATES PATENTS 2,437,232    Rothrock et al. _____ Mar. 2, 1948

FOREIGN PATENTS 588,834    Great Britain _____ June 4, 1947

OTHER REFERENCES

Gordon and Dolgin: Surface Coating and Finishes © 1954, published by Chemical Publishing Co., N.Y., N.Y.), pps. 68, 69. (Copy in Scientific Library.)

UNITED STATES PATENT OFFICE
CERTIFICATE OF CORRECTION

April 7, 1959

Patent No. 2,881,145

Alfred F. Schmutzler

It is hereby certified that error appears in the printed specification of the above numbered patent requiring correction and that the said Letters Patent should read as corrected below.

Column 2, line 21, for "should be" read -- should use --; line 46, for "avalable" read -- available --.

Signed and sealed this 21st day of July 1959.

(SEAL)
Attest:

KARL H. AXLINE
Attesting Officer

ROBERT C. WATSON
Commissioner of Patents